United States Patent [19]

Chaum

[11] Patent Number: 4,759,064
[45] Date of Patent: Jul. 19, 1988

[54] BLIND UNANTICIPATED SIGNATURE SYSTEMS

[76] Inventor: David L. Chaum, 14652 Sutton St., Sherman Oaks, Calif. 91403

[21] Appl. No.: 784,999

[22] Filed: Oct. 7, 1985

[51] Int. Cl.⁴ ............................................. H04L 9/00
[52] U.S. Cl. ....................................... 380/30; 380/28
[58] Field of Search .................. 178/22.11; 380/30, 28

[56] References Cited

U.S. PATENT DOCUMENTS

4,086,634  4/1978  Cook ...................................... 360/60
4,308,536  12/1981  Sims, Jr. et al. ........................ 342/71
4,458,109  7/1984  Mueller-Schloer ............... 178/22.11

Primary Examiner—Salvatore Cangialosi
Assistant Examiner—Aaron J. Lewis
Attorney, Agent, or Firm—Larry S. Nixon; Aldo J. Test

[57] ABSTRACT

An improved blind signature system not requiring computation during blinding for anticipating which of a plurality of possible signatures will be made during signing, while still allowing the blinding party to unblind and recover the unanticipated kind of signature on what was blinded. An exemplary embodiment blinds by forming a product including a plurality of generators raised to powers normally secret from the signing party, and unblinds by forming a product with the multiplicative inverse of a signed form of the generators raised to the original powers. Re-blinding allows a signature on a value to be transformed into a signature on a particular blinded form of the value.

44 Claims, 2 Drawing Sheets

BLIND UNANTICIPATED SIGNATURE SYSTEMS

BACKGROUND OF THE INVENTION

1. Field of the Invention

This invention relates to cryptographic systems, and more specifically to systems including public key digital signatures.

2. Description of Prior Art

By now the potential of the public key digital signature in commercial applications of cryptography is widely appreciated. A system using such signatures, called blind signatures, is presented in the co-pending application of the same applicant, U.S. application Ser. No. 524,896 and European Patent Application No. 84201160.3 published as publication No. 0139313A2 on May 2, 1985, which are included herein by reference. The present application relates to a novel blind signature system, as will be presented.

In an RSA public key signature system, a party who may be called the signer chooses two appropriate large primes p and q, and makes their product n ($=p\cdot q$) public. The signer also makes public one or more public exponents $e_1, \ldots, e_i$. Additionally the signer computes corresponding secret exponents $d_1, \ldots, d_i$ satisfying $d_i \equiv e_i^{-1}(\mod(p-1)\cdot(q-1))$. The signer forms the ith signature on a number m as $m'_i \equiv m^{d_i}(\mod n)$. Anyone can use the public n and $e_i$ to verify the signature on m by checking that $m \equiv (m'_i)^{e_i}(\mod n)$ holds.

The blind signature concept recognizes the utility of keeping the signer performing a commercial service, such as validating electronic bank notes, notarizing or time stamping electronic documents, etc., from determining the exact content of each message signed. The essential concept of the preferred embodiments of the co-pending application mentioned is that a party wishing a signature on some message first blinds the message before submitting it to the signer for the signature, and then is able to unblind the signed message received from the signer to recover the original message bearing the signature. In a preferred embodiment of the already mentioned application, the blinding of a message m with a random r produces $t \equiv m\cdot r^{e_i}(\mod n)$, the signing of t yields $t' \equiv m^{d_i}\cdot r(\mod n)$, and the provider unblinds t' by forming $m'_i \equiv t'\cdot r^{-1}(\mod n)$, yielding $m'_i \equiv m^{d_i}(\mod n)$.

Notice that it is necessary for the provider to anticipate the particular $d_i$ to be used by the signer. Its is possible, though computationally expensive, for the provider to anticipate a few possible $d_i$ by forming $t \equiv m\cdot r^{e_1 e_2}(\mod n)$ for example, and being able to unblind in case of signature with $d_1$ or $d_2$ by forming $m'_1 \equiv (m\cdot r^{e_1 e_2})^{d_1}\cdot r^{-e_2}(\mod n)$ or $m'_2 \equiv (m\cdot r^{e_1 e_2})^{d_2}\cdot r^{-e_1}(\mod n)$, depending on whether $d_1$ or $d_2$ was used to sign, respectively. But such an approach becomes prohibitively computation intensive as the number of alternatives increases, in general requiring the provider to perform more than one multiplication for each alternative anticipated, since each $e_i$ should have a unique prime factor otherwise some signatures can be made from others. Such effort required to anticipate all possible signatures may not be practical, and is also undesirable because the maximal extent of a system has to be fixed initially and effort required for the maximal extent has to be carried out from the beginning. Of course such an approach becomes impossible in practice when the number of alternatives is large or when the alternatives are not known in advance of the blinding transformation.

Even the simple payments system mentioned in the co-pending application has advantage in the bank's customer supplying a large number of blinded items when an account is opened, without the customer knowing in advance the particular choice of signature, which the bank will use to encode the denomination and possibly other data when it ultimately issues the notes. Additionally, improved security in some protocols can result if the parties must fix certain parameters before the kind of signatures to be used are revealed. It is anticipated that many other uses of blind signatures may find considerable advantage if not practical necessity in systems not requiring the kind of signature(s) to be anticipated in advance of blinding.

OBJECTS OF THE INVENTION

Accordingly, it is an object of the present invention to provide a system for blind signatures in which the amount of computation required for blinding and unblinding does not grow with the number of possible kinds of signatures anticipated.

Another object of the invention is to provide a blind signature system which allows blinding to take place without knowledge of which kind of signature will be provided.

A further object of the invention is to provide a blind signature system which allows a number of kinds of signatures that are unlimited in practice, even after blinding has been completed.

Yet another object of the invention is to provide security against attacks exploiting blinded numbers formed using advance knowledge of the kind of signature, by allowing such attacks to be made ineffective by preventing advance knowledge of kind of signature.

Still another object of the invention is to provide efficient, economical and practical apparatus and methods fulfilling the other objects of the invention.

Other objects, features, and advantages of the present invention will be appreciated when the present description and appended claims are read in conjunction with the drawing figures.

BRIEF SUMMARY OF THE INVENTION

In accordance with these and other objects of the present invention, a brief summary of some exemplary embodiments is presented for illustrative purposes and should not be taken to limit the scope of the invention, which is described more fully elsewhere in the present specification.

In one embodiment of the invention, based on the RSA digital signature system as earlier described, the following congruences might hold:

$$t \equiv [m]\cdot g^{k_1}\cdot k_2(\mod n)$$

$$t' \equiv [m\cdot g^{k_1}\cdot k_2]^{d_i}(\mod n)$$

$$m' \equiv [(m \cdot g^{k_1} \cdot k_2)^{di}] \cdot g^{-dik_1} \cdot k_2 (\mod n)$$

where n is the publicly known modulus, e and d are exemplary public and private signature exponents respectively, and $k_i$ are keys with $k_2 = 1$ or $k_2 = n - 1$.

The square brackets show the input to the transformation whose output is shown on the left-hand-side, and thus they define the function of each of the three transformations in the order shown: blinding 103, signing 102, and unblinding 104. In accordance with the teachings of the present invention, the blinding transformation 103 need not depend on the kind of signature made by the signer. The signature property of m' might be checked by anyone with access to the public signing function based on $e_i$, simply by forming $m'^{ei}(\mod n)$ and checking whether the result is a valid message m.

In an alternate exemplary embodiment, the following congruences show how the same functions might be performed in a more general way:

$$t \equiv [m] \cdot g_1^{k_1} \cdot g_2^{k_2} \cdot \ldots \cdot g_r^{k_r} (\mod n)$$

$$t' \equiv [m \cdot g_1^{k_1} \cdot g_2^{k_2} \cdot \ldots \cdot g_r^{k_r}]^{di} (\mod n)$$

$$m' \equiv [(m \cdot g_1^{k_1} \cdot g_2^{k_2} \ldots g_r^{k_r})^{di}] \cdot g_1^{-dik_1} \cdot \ldots \cdot g_r^{-dik_r} (\mod n).$$

GENERAL DESCRIPTION

General descriptions of some constituent parts of the present invention is now presented.

Line 156 shows the output of blinding transformation 103 being input to signing transformation 102; line 158 shows the output of signing transformation 102 being input to unblinding transformation 104; and line 161 shows the utput of unblinding transformation 104 being input to signature checker 105 and re-blinding transformation 106. The method or means whereby such information is transferred as shown by such lines is not essential to the present invention, and may be accomplished in any suitable way. For example, the output or input means may be brought into physical proximity with each other, or they may communicate remotely by any kind of communication network or other technique. The information may be encoded in various forms, some of them cryptographic, and decoded and transformed between codings on its way. Similarly the information may be stored and/or detained in various forms along its way.

The term "party" is used herein to indicate an entity with control over some secret information. In some cases, a party might be a person who knows a secret cryptographic key. It is anticipated that a plurality of people may each know part or all of some key matter, and then they might collectively be thought of as a party. In other cases, a key may normally be known only to apparatus and not people, and the apparatus or the people able to utilize the apparatus may be regarded as parties. Different people may use the same apparatus each with different keys, assuming they all have some trust in the apparatus, and then they might be regarded as separate parties. Thus, for example, signature transformation 102 may be regarded as a step in a method or part of an apparatus, and/or it may be regarded as a party, and it may be called signer 102 or signer party 102.

Key source 123 is shown without inputs and with output 154 (and 153 to be described later). The function of key source 123 is to output a value normally at least partially unknown to at least the signer party 102. It is preferred that the output is nearly completely unknown outside the provider 101, and may not even be known to any persons but to only apparatus. The term "secret key" may be used herein to refer to information, such as the output of key source 123, that is normally supposed to be unknown to various parties. Many means and methods are known in the art for generating such keys. One approach uses unpredictable physical phenomena, such as noise in a semiconductor or other electronic component or radioactive decay, or timing of events generated by asynchronous processes, such as humans pushing buttons. Another approach uses algorithmic trnsformations on other secret information. Of course these two approaches can readily be combined. The output of the key source 123 is shown as input to transformations 103 and 104. The probability distribution of keys is obviously of interest. In the preferred embodiment, they are preferably as nearly uniformly distributed as practical. The output may be generated initially for one, and then retained, possibly in encrypted form, and/or in some protected and/or tamper indicating or tamper responding apparatus. An equivalent approach for the present invention would be regenerating the key algorithmically each time it is needed. In the preferred embodiment of FIG. 1, line 153 is a second output of key source 123. It is preferably independent of line 154 and thus could be implemented by a second key source if desired. It only takes on the values 1 and $n-1$.

Signature checker 105 is shown taking its input from the output of unblinding transformation 104, line 161, and producing output 163, shown as m. The function of checker 105 is to produce an indication of whether the input value has the properties of a valid signature. An implicit input is the public signature information, shown as e in the preferred embodiment. The authenticity of this information froms the basis for the authenticity decision about the signature input, and thus such information may be shown contained within checker 105. Checker 105 serves a logical function of indicating whether or not the signature appears to have been transformed using the secret signature information corresponding to the public signature information; any means or method performing this function may be regarded as a signature checker. (Other data may also be output by the checker 105, such as parameter values included during formation of the signature.)

Various signature means and methods are known or would be obvious to those skilled in the art. One method, that of choosing a subset of the domain of the signature function as valid messages, is well known in the art. Another approach might not make such a restriction, but might instead rely on information additional to the output of the signature function for input to the checking function. One-way functions may be thought of as public functions without publicly known inverses, such functions being well known in the art, such as the public function of an RSA system as earlier described, or those first disclosed by Purdy in "A High Security Log-in Procedure," Communications of the ACM, Vol. 17, No. 8, August 1974, p442. Suppose the range of a one-way function y is the domain of a private signing function f', with public signature function inverse f. One way to use such functions to form digital signatures is to form a signature, s, as the secret signature function of the image of the desired message, a, under the one-way function, $s = f'(y(a))$. A signature can be authenticated under such a scheme if numbers a and s are presented to the checker 105, such that $y(a)=f(s)$. Notice that if the domain of y is larger than its range, then it serves to compress the matter to be signed. Also notice that if the range of y is smaller than the domain of f', then all or part of the number a may be encoded as the rest of the domain of f'. In some cases a strict one-way property may not be required.

Figure 1:
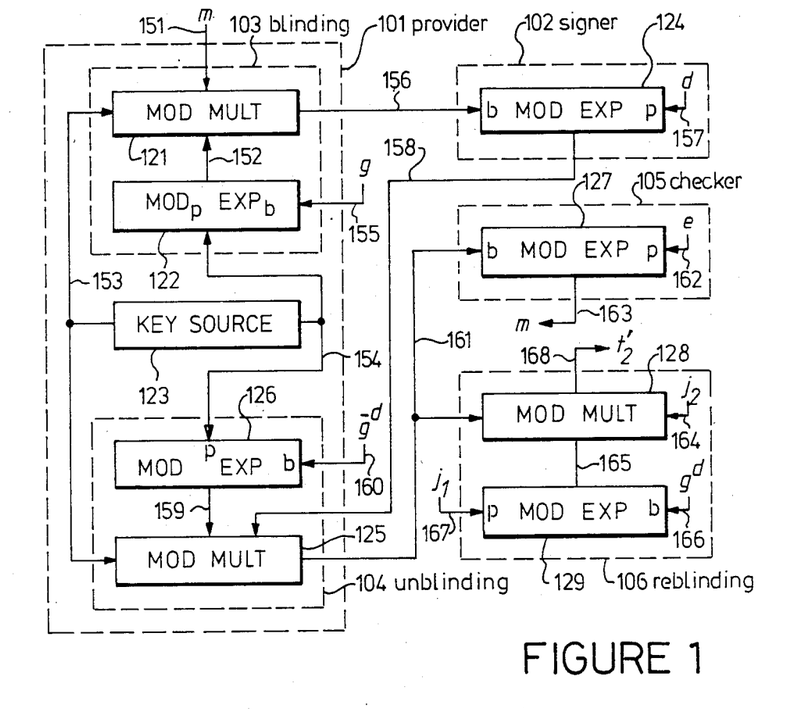
FIG. 1 shows a combination functional and detailed block diagram of a blind unanticipated signature system in accordance with the teachings of the present invention.

Signing transformation 102 outputs some transformation of its input which depends on signing information at least secret from the other parties, shown as d in the embodiment of FIG. 1. Various exemplary signing transformations have been described above, but the function of the signing transformation should be regarded as any transformation at least partially responsive to the information to be signed and to secret signing information, such that some suitable checking function can be performed meaningfully. The term party, as mentioned earlier, may be used when referring to the signing transformation 102, and then it would be appropriate to say signer 102.

Blinding transformation 103 takes a message from line 151, shown as m in the embodiment of FIG. 1, and a secret key from lines 154 and 153. The nature of the source of m is not essential to the present invention, but the particular value of m resulting in an actual particular output of blinding transformation 103 received by signer 102 should not normally be revealed to the signer 102 by such a source, as this would allow the correspondence to be learned by the signer. The function of blinding transformation 103 is to produce output that does not normally reveal the actual message input to those not in possession of the secret key k, and to cooperate with the singing and unblinding transformations, as will be described. Thus, the blinding transformation may be thought of as a cryptographic transformation which hides some message by use of a key, with additional properties that allow it to cooperate with the other transformations.

Unblinding transformation 104 takes a key from lines 154 and 153 and a value from the signature transformation 102 on line 158, and produces an output shown as line 161. The function of unblinding transformation 104 is to transform its input into a form which "retains a digital signature property related to original message m". In other words, a checker 105 should be able to return a positive result when supplied output of unblinding transformation 104, and possibly other appropriate information, such result indicating that a signature related to the original message m has been authenticated.

A value shown as g is input on line 155 to blinding transformation 103; the multiplicative inverse of its dth power modulo n, $g^{-d}$, is shown as input to un-blinding transformation 104; and its dth power modulo n, $g^d$, is input to re-blinding transformation 106. Further, various $g_i$ and their powers are described later in detail with reference to the generalized embodiment of FIG. 2. Thus when a new public exponent $e_i$ is to be used, the signer may make public the $e_i$th root of the generator(s) g. Once such roots are public, their multiplicative inverses are readily determined by well known techniques, and they can be retained by, or provided as needed to, un-blinders and re-blinders, all in ways obvious to those of ordinary skill in the art and unessential to the present invention. The g's may be selected at random by some single party or, for example, by a public event as will be described for selecting the index i, but the particular way suitable g's are selected is not essential to the present invention.

Re-blinding transformation 106 takes an unblinded but signed message from line 166 and keys $j_1$ and $j_2$ to be described, and provides a blinded and signed form of its input. A significant use of such techniques is that a blinded form of the original message m may be known to a party, who will then be able to verify the output of the re-blinder as the signature on the form known. The particular arrangements for retaining or re-generating and supplying the $j_1$ and $j_2$ and appropriate signed g are of course unessential and readily accomplished by means that would be obvious to those of skill in the art.

Figure 3:
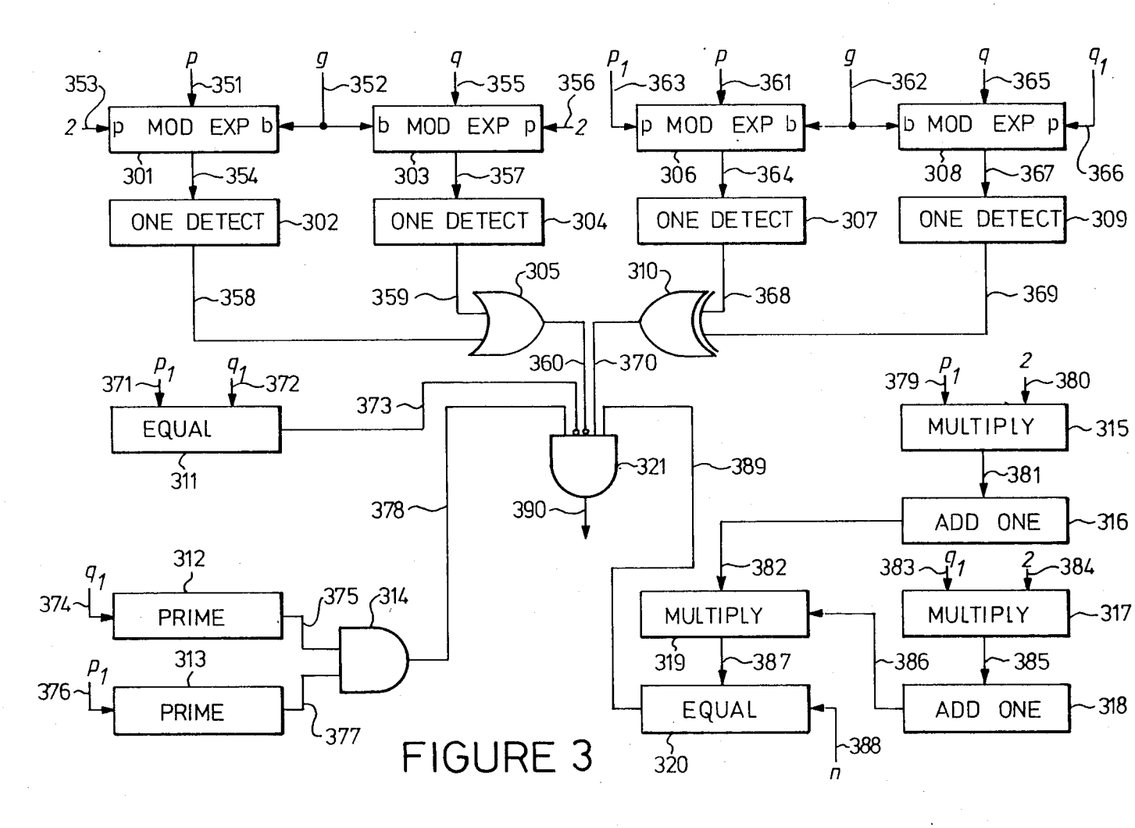
FIG. 3 is a detailed schematic diagram of an exemplary embodiment of a generator tester.

The generator tester shown in FIG. 3 is shown taking inputs g, $p_1$, $q_1$, p, q, and n, and producing a single logic valued output on line 390 indicating the acceptability of the inputs. The function of the generator tester is to indicate whether generators input are suitable for use in a digital signature system based on the other inputs, and any suitable means for accomplishing this may be employed without departing from the scope of the present invention. The exemplary embodiment of FIG. 3 takes inputs p and q which are normally secret to the signing party, since knowing theses allows signatures modulo $n(=p\cdot q)$ to be formed. Thus the generator tester function may safely be employed by the signer or parties trusted by the signer. Another approach allows anyone to submit apparatus to the signer that includes a suitable generator tester. The signer supplies the generator tester with the secret parameters and allows the logic result to be communicated to the supplier of the apparatus without allowing the secret parameters to be leaked by the apparatus to its supplier. One exemplary way to allow the signer to be sure nothing is leaked to the supplier and still to provide confidence to the supplier is as follows: the supplier creates a number c' at random, applies a publically known and agreed on one-way function f, which is preferably one-to-one, to c' yielding c=f(c'); installs c' and n in the apparatus; and gives c to the signer along with the apparatus. Then the signer isolates the apparatus from the supplier and provides the apparatus with the secret parameters ($p_i$, $q_i$, p, q, for example); applies f to the output of the apparatus; and if this equals the original c supplied, returns this c' to the supplier. The apparatus is constructed in a way making it difficult for the signer to obtain c' from it in the expected time interval unless the generator tester yields a logic high, such tamper resistant techniques being known in the art.

In another approach, a prospective signer makes public a plurality of moduli $N_i$ and corresponding generators $G_i$ for each. Others determine the single modulus n among these that will be used, whereupon the signer must make public all the secret parameters p, q, etc. for all the moduli except the one selected. Then anyone may use a generator tester to verify all the other moduli and corresponding generators, thereby obtaining some confidence that the selected modulus would also pass the generator tester's test with the corresponding generator. One way to select the i would be a public event during which coin flips, gambling equipment, or the like is used to determine i. In another way to determine i, each of a plurality of persons forms a $b'_i$ at random and a corresponding $b_i=f(b'_i)$ using a preferably one-one, public one-way function f. Then each makes public $b_i$. When all the $b_i$ are public, the $b'_i$ are revealed, checked, and added modulo the number of moduli, yielding the index i selecting the modulus/generator pair.

Yet another way to allow those other than the signer to have confidence in the suitability of generators is for the generators to be determined in a way that cannot easily be manipulated by at least the signer. Generators could be chosen by a random process, such as those already described for selecting a particular modulus. Use of a single such randomly chosen and untested generator might not provide a high enough probability of providing adequate "hiding" or "unlinkability", as mentioned in the referenced co-pending application. It is believed that use of a plurality of generators, as will be described in detail, improves the degree of hiding and unlinkability. For example, use of 22 generators is believed to provide a probability of less than $10^{-6}$ that not all blinding factors in the reduced residue system modulo n can be generated. Thus, one possible use of the present invention does not require generator testers. Of course the foregoing techniques can be combined in a variety of ways that would be obvious to those of skill in the art.

DETAILED DESCRIPTION OF PREFERRED EMBODIMENT

Turning now to FIG. 1, a detailed description of a preferred embodiment of the present invention will be presented. One party to the system will be referred to as the "provider", shown as contained in the dashed box 101. Another distinguished party in the system is the "signer", shown as contained within dashed box 102. A key source 123 for developing a secret key preferably confidential to the provider, is shown contained within the provider 101. A secret signing key, shown for clarity as d but more generally standing for a $d_i$, is shown contained within signer 102. The provider also contains the ability to perform two transformations: a "blinding" transformation 103 and an "unblinding" transformation 104. In addition, a checking function 105 and a re-blinding transformation 106 are also shown.

The interconnection of the elements shown in FIG. 1 will now be described in detail.

The message shown as m appears on line 151 as one multiplicand input to modular multiplier 121, such multipliers to be described. Notice that it is not essential whether the m is developed within or outside provider 101. A second multiplicand input to modular multiplier 121 is from line 152, which is the output of modular exponentiator 122, such modular exponentiators to be described. A third multiplicand input, whose value is either 1 or $n-1$, to modular multiplier 121 appears on line 153, and is one output of key source 123, such key sources having been described and to be described further. The exponent or, as used equivalently here, power input to modular exponentiator 122 appears on line 154, which is a second output of key source 123. The base input to modular exponentiator 122 appears on line 155 and is shown as g. The output of modular multiplier 121, output of blinding transformation 103, appears on line 156, which is input to signer 102 and base input to modular exponentiator 124. The power input to modular exponentiator 124 is on line 157, and is shown as d. The output of signer 102 and modular exponentiator 124, appears on line 158, which is input to unblinder 104 and a first multiplicand input to modular multiplier 125. A second multiplicand input to modular multiplier 125 appears on line 153, already mentioned. A third multiplicand input to modular multiplier 125 appears on line 159, which is the output of modular exponentiator 126. The base input to modular exponentiator 126 appears on line 160, shown as $g^{-d}$, and the power input appears on line 154, already described.

The output of modular multiplier 125, and unblinding transformation, or alternatively unblinder 104, appears on line 161, which is input to checker 105 and re-blinding transformation or re-blinder 106. The base input to modular exponentiator 127 is on line 161, the power input on line 162, shown as e for clarity but more generally standing for an $e_i$, and the output on line 163, shown as m. One multiplicand input to modular multiplier 128 is on line 161, a second input is on line 164 shown as $j_2$, which assumes values 1 and $n-1$, and a third input is on line 165, output of modular exponentiator 129. Modular exponentiator 129 has base input on line 166, shown as $g^d$, and power input on line 167, shown as $j_1$.

The operation of the embodiment shown in FIG. 1 will now be described in detail.

A message m on line 151 is known to the provider. One output of key source 123 appears on line 154, is denoted by $k_1$, and takes values preferably chosen from the interval 1 to s, and preferably chosen as uniformly as possible, where s is preferably many time larger than n. The other output of key source 123 is on line 153, is denoted by $k_2$, and takes a value chosen as nearly uniformly as practical from the set containing the two values 1 and $n-1$. The values of the parameter shown as g, which is known to the blinder as has been mentioned, appears on input line 155. The blinding transformation 103 takes these four inputs—from lines 151, 154, 153, and 155—and produces output on line 156 denoted by t, such that $t \equiv m \cdot g^{k_1} \cdot k_2 \pmod{n}$ holds. These functions of blinding transformation 103 are accomplished as follows. Modular expenentiator 122 takes base g from line 155 and raises it to power $k_1$ from line 154, producing an output value congruent modulo n to $gk_1$ on line 152. Modular multiplier 121 forms the product of this output on line 152, the input m on line 151, and the value $k_2$ on line 153, and provides the product modulo n on its output line 156.

Now the signer 102 may obtain the blinded message t from line 156, and will normally output a digital signature of t on line 158, this output denoted as t', such that $t' \equiv t^d \pmod{n}$, where d is the secret signing exponent of the signer mentioned earlier. These functions of the signer 102 are accomplished as follows modular exponentiator 124 takes its base input from line 156, takes its power input from line 157, and provides its output on line 158 as the residue modulo n of the result of exponentation.

Now the provider may perform the unblinding transformation 104. The output of the signer, t', and the secret keys $k_1$ and $k_2$ are inputs to this function and it produces, in this embodiment, a digital signature on m, denoted m', such that $m' \equiv m^d \pmod{n}$. This function of the unblinding transformation is performed as follows. First, modular exponentiator 126 raises the value on line 160, denoted $g^{-d}$, to the power from line 154, denoted $k_1$, providing its output on line 159. When the value denoted t' appears on line 158, modular multiplier 125 forms the product of its three inputs—from lines 158, 159, and 153—and provides the residue modulo n of the product as its output on line 161.

At some later time, one or more parties may wish to check or authenticate the digital signature m' on the original message m. This function may be performed by checking that $m \equiv m'^3$, and that m is a valid message, as described earlier. This function can be performed by the modular exponentiator 127, taking its base input from line 161 and its power from line 162, and providing output on line 163. A specific example of further checking for valid messages or the like is not shown for clarity, but such techniques would be obvious from the earlier description, and are well known to those of ordinary skill in the art. For example, the binary representation of the value on line 163 could be split into two halves, and the number considered valid if the result of comparing the two halves indicates they are identical.

At some time after unblinding, some party, such as the provider, may wish to re-blind the signed message m' to produce a new value $t'_2$ which is checkable as the signature with d on blinded message $t_2$. The value of $t_2$ might have been, for example, produced from the same m during another operation of binder 103 that had $k_1 = j_1$ and $k_2 = j_2$. The re-blinding transformation 106 takes its input m' from line 161 and $g^d$ from line 166, and produces output $t'_2$ on line 168, responsive to keys $j_1$ on line 167 and $j_2$ on line 164, such that $t'_2 \equiv m^d \cdot g^{dj_1} \cdot j_2 \pmod{n}$ holds. Generation of $j_1$ and $j_2$ is not shown for clarity, but may as mentioned be essentially the same as that already described for $k_1$ and $k_2$, respectively. These functions are accomplished as follows. Modular exponentiator 129 takes its base input from line 166 and its exponent from line 167 and produces its output on line 165. Then modular multiplier 128 takes its input from line 165, 161 and 164, and provides the residue modulo n of the product of its three inputs as output $t'_2$ on line 168.

Figure 2:
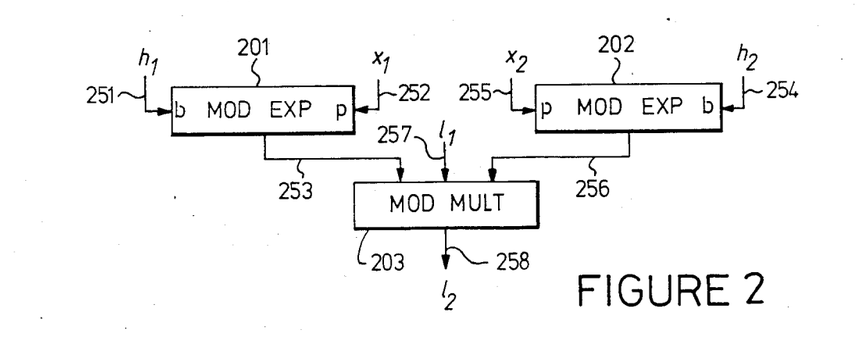
FIG. 2 is a detailed schematic diagram of an exemplary embodiment of a generic transformation.

An alternate exemplary embodiment for blinding transformation 103, unblinding transformation 104, and reblinding transformation 106 will now be presented in detail. Referring now to FIG. 2, a generic alternate for each of the three transformations is shown.

The detailed interconnections are a follows. Modular exponentiator 201 takes its base input from line 251, shown as $h_1$, its exponent input from line 252, shown as $x_1$, and provides its output on line 253. Similarly, modular exponentiator 202 takes its base input from line 254, shown as $h_2$, its exponent input from line 255, shown as $x_2$, and provides its output on line 256. Modular multiplier 203 takes its multiplicand inputs from lines 253, 256 and from line 257 denoted $l_1$, and provides the residue modulo n of the product as its output on line 258, denoted $l_2$.

The detailed operation of the generic alternate is as follows. Modular exponentiator 201 obtains its base input from line 251, denoted $h_1$, its power input from line 252, denoted $x_1$, and then produces the residue modulo n of the exponentiation as its output on line 253. In the same way, modular exponentiator 202 obtains its base input on line 254, denoted $h_2$, in its power input on line 255, denoted $x_2$ and then provides the residue modulo n of the exponentiation as its output on line 256. Modular multiplier 203 forms the residue modulo n of the product of the output of exponentiators 201 and 202, when the outputs are available, and provides this product as its output on line 258.

When the generic transformation of FIG. 3 is substituted for blinding transformation 103 of FIG. 1, the inputs and output on line 151, 155, 154, 153 and 156 are replaced by inputs and output 257, 251, 252, 255, and 258, respectively. Similarly, when the generic transformation is substituted for unblinding transformation 104, the inputs and output 158, 160, 154, 153, and 161 are replaced by 257, 251, 252, 255, and 258, respectively.

Again, similarly, when the generic transformation is substituted for re-blinding transformation 106, lines 161, 166, 167, 164 and 168 are replaced by 257, 251, 252, 255, and 258, respectively. Of course this leaves lines 254 without input. These would take the value n−1 to give results which, apart from interchanging the values 1 and n−1 taken on by $k_2$ and $j_2$ believed not to have any practical effect because they are generated in a random way, are essentially the same as those obtained by the embodiment of FIG. 1 already described.

Of course line $h_2$ could take on values other than n−1 in some embodiments. For example, when used in blinding transformation 103, $h_2$ might be a generator $g_2$; when used in unblinding transformation 104, $h_2$ might be the multiplicative inverse of the appropriate eth root of $g_2$, denoted $g_2^{-d}$; and when used in re-blinding transformation 106, $h_2$ might be the appropriate eth root of $g_2$, denoted $g_2^d$. More generally, as would be obvious to those of ordinary skill in the art, the generic transformation could be realized with a number of modular exponentiators different from 2, say r. Thus there would be r base inputs $h_1, \ldots, h_r$, and r exponent inputs $x_1, \ldots, x_r$, and the product of the r outputs of the r exponentiators would be input to modular multiplier 203. Then the generic transformation would have $2 \cdot r + 1$ inputs and one output. One input would of course be m, t' or m', for transformations 103, 104 and 106, respectively. The r power inputs $x_1, \ldots, x_r$ would be derived from r separate outputs of key source 123, or as may be equivalent, from r separate key sources. Separate key source(s), or the results of other outputs of the same key source(s), would be used for re-blinding transformation 106. The r base inputs $h_1, \ldots, h_r$ would be supplied as the remaining inputs. Of course each $h_i$ corresponding to an input $g_i$ for blinding transformation 103 should be related to the corresponding $g_i^{-d}$ input to unblinding transformation 104. Similarly each $g_i^d$ for re-blinding transformation 106 should be related to some corresponding $g_i$ input used to construct the corresponding blinded form.

Turning now to FIG. 3, a detailed description of a generator tester is presented.

Modular exponentiator 301 takes its modulus, shown as p, from line 351; its base input, shown as g, from line 352; its power input, shown as 2, from line 353; and supplies its output on line 354 to one detector 302, to be described. Similarly, modular exponentiator 303 takes its modulus, shown as q from line 355; its base from line 352; its power, shown as 2, from line 356; and supplies output on line 357 to one detector 304. These one detectors 302 & 304 (and 307 & 309 to be described) output a logic high when their input is a one, and output a logic low otherwise, such detectors being well known in the art. OR-gate 305 takes the logic values from lines 358 and 359 as input and provides its output on line 360.

Modular exponentiator 306 takes its modulus, shown as p, from line 361; its base input, shown as g, from line 362; its power input, shown as $p_1$, from line 363; and supplies its output on line 364 to one detector 307, already described. Similarly, modular exponentiator 308 takes its modulus, shown as q form line 365; its base from line 362; its power, shown as $q_1$, from line 366; and supplies output on line 367 to one detector 309. XOR-gate 310 takes the logic values from one detectors 307 and 308 output on lines 368 and 369 as input and provides its output on line 370.

Equality tester 311 takes input, shown as $p_1$, from line 371; input, shown as $q_1$ from line 372; and provides a logic high on its output line 373 if its inputs are equal, and logic low otherwise, such comparators well known in the art. Primality tester 312 takes its input from line 374, shown as $q_1$, and provides a logic high on its output line 375 when its input is a prime number and logic low on its output otherwise. Such primality testers being well known in the art, such as, for example, those required to develop the two prime factors whose product is used as the modulus in an RSA system, as currently used in practice. A well known simple example technique, believed highly reliable though not provably infallible, raises a plurality of numbers to powers modulo one minus the candidate, and yields logic high only if all the results are one. Similarly, primality tester 313 takes input, shown as $p_1$, from line 375 and provides its output, as just described, on line 377. The AND-gate 314 takes the logic values from lines 375 and 377, providing its output on line 378. Ordinary multiplier 315, as are well known in the art, takes one multiplicand, shown as $p_1$, from line 379 and the other, shown as 2, from line 380 and provides output on line 381 to add one 316, whose output is on line 382. Similarly, ordinary multiplier 317 takes input, shown as $q_1$, from line 383 and from line 384, shown as 2, and provides output on line 385, which is input to add one 318, whose output is on line 386. Ordinary multiplier 319 takes multiplicands from lines 382 and 386, before providing output on line 387. Then equality tester with numeric inputs on lines 387 and 388, shown as n, provides logic valued output on line 389. Finally, AND-gate 321 takes logic valued inputs from lines 378, 370 & 389, and inverted logic inputs from lines 360 & 373, and provides their conjunction on output line 390, the output of the generator tester.

Now consider the detailed operation of the generator tester. Modular exponentiator 301 raises inputs g to power 2, outputting the residue modulo p to one detector 302, which then provides a logic high on its output 358 if its input is one, and logic low otherwise. Similarly, modular exponentiator 303 raises input g to power 2 and provides the residue modulo q produced to one detector 304, which outputs logic high if its input is one and logic low otherwise. Then OR-gate 305 develops the disjunction of its two inputs and provides this on its output line 360. Again similarly, Modular exponentiator 306 raises input g to power $p_1$, outputting the residue modulo p to one detector 307, which then provides a logic high on its output 368 if its input is one, and logic low otherwise; modular exponentiator 308 raises input g to power $q_1$ and provides the residue modulo g to one detector 309, which outputs logic high if its input is one and logic low otherwise. Then XOR-gate 310 develops the disjunction of its two inputs and provides this on its output line 370. Equality tester 311 compares $p_1$ to $q_1$, and brings its output line 373 high if they are the same and low otherwise. Primality tester 312 and 313 test $q_1$ and $p_1$ respectively, and raise their output lines, 375 and 377 respectively, in case of primality and lower them otherwise. Then AND-gate 314 outputs the conjunction of these lines 375 and 377 on line 378. Ordinary multiplier 315 forms the product of $p_1$ and 2, and provides this on line 381. Add one 316 adds one to this input from line 381 (i.e. increments it by one) and provides this output on line 382. Similarly, ordinary multiplier 317 forms the product of its inputs $q_1$ and 2, and outputs this on line 385 to add one 318. Then add one 318 increments its input and provides the resulting output on line 386. The ordinary multiplier 319 forms the product of these two inputs from lines 382 and 386, and provides this product on line 387. Then equality tester 320 tests this input from line 387 with n for equality, and provides logic high on its output 389 if they are equal and logic low otherwise. Finally, AND-gate 321 outputs on line 390 the conjunction of the values on its input lines 378, 370 & 389, conjoined with the inverses of its inputs on lines 360 and 370.

Now consider how this exemplary generator tester operating with $p-1$ and $q-1$ each having exactly one odd and one even prime factor can be readily generalized to any numbers y and z of odd prime factors for $p-1$ and $q-1$, respectively. Exponentiator 301 is replaced by y exponentiators, each using modulus p and base g, but the ith uses $2 \cdot p_1 \cdot \ldots \cdot p_y / p_i$ as power input, such products readily formed by well known techniques such as simply excluding the ith term. The y one detector outputs are suplied to y inputs of an OR-gate serving in place of gate 305. Similarly, exponentiator 303 is replaced by z exponentiators, each using base g and modulus q, and providing their outputs to separate one detectors, whose outputs feed the remaining z inputs of the OR-gate mentioned replacing gate 305. The exponentiators 306 and 308 remain unchanged, except that their power inputs 363 and 366 are replaced by $p_1 \cdot \ldots \cdot p_y$ and $q_1 \cdot \ldots \cdot q_z$, respectively, such products formable by well known techniques not shown for clarity. Equality tester 311 is readily extended to test that no pair $p_i$ and $q_j$ are equal. This might be accomplished, for example, by well known techniques of multiple comparators whose outputs are conjoined, or by a one detected output of the GCD of $p_1 \cdot \ldots \cdot p_y$ and $q_1 \cdot \ldots \cdot q_z$, such a GCD being readily computed by techniques well known in the art, such as those nearly the same as those used for computing modular multiplicative inverses. Each $p_i$ and $q_i$ must be tested for primality by a separate primality tester, replacing testers 312 and 313, whose $y+z$ outputs are then conjoined by an AND-gate replacing gate 314. It is believed acceptable to inhibit the test for oddness for the $p_i$ or for the $q_i$, depending whether the output of the corresponding one detector 307 or 309 is logic low. Thus, the tester in general tests that all the following conditions are satisfied: no i exists for which $1 \equiv g^{2 \cdot p_1 \cdot \ldots \cdot p_y / p_i} \pmod{p}$ or $1 \equiv g^{2 \cdot q_1 \cdot \ldots \cdot q_z / q_i}(\mod q)$ holds; exactly one of $1 \equiv g^{p_1 \cdot \ldots \cdot p_y} \pmod{p}$ with $p_i \neq 2$ or $1 \equiv g^{q_1 \cdot \ldots \cdot q_z} \pmod{q}$ with $q_i \neq 2$ holds; GCD $(p-1, q-1)=2$; and $n=(2 \cdot p_1 \cdot \ldots \cdot p_y + 1) \cdot (2 \cdot q_1 \cdot \ldots \cdot q_z + 1)$.

While these descriptions of the present invention have been given as examples, it will be appreciated by those skilled in the art that various modifications, alternate configurations and equivalents may be employed without departing from the spirit and scope of the present invention.

I claim:

1. A method for processing a plurality of original digital messages by plural provider parties before they are transformed with public key digital signatures by a signer party and for processing the resulting messages by the corresponding provider parties after they have been transformed with the public key digital signatures where said processed digital messages are considered to be "blinded" and said resulting digital messages to be "unblinded" because, although the public key digital signatures of said resulting digital messages are checkable using a public key, the signer is unable to determine the correspondence, between elements of said processed digital message set and elements of the corresponding said resulting digital message set, said method for processing comprising the steps of:

blinding a plurality of original digital messages by a plurality of corresponding supplier parties transforming each such message at least partially responsive to a corresponding first key to produce corresponding digital first messages, without anticipating which of a set of corresponding signing keys will be used to sign each first message;

signing each of said first messages by a signer party applying a public key digital signature using one member of said set of secret signing keys to produce a corresponding plurality of second messages;

unblinding said plurality of second messages by said supplier parties transforming each at least partially responsive to said first keys to produce a corresponding plurality of digital third messages which retain a public key digital signature property related to said original messages and to said corresponding secret key of said signing step;

said blinding step being performed by said supplier parties using said first keys so as to make said signer party without the corresponding first keys unable to readily determine the correspondence between individual messages within said plurality of third messages and individual messages within said plurality of first messages; and the number of members of said set of signing keys potentially unblindable by said unblinding step being substantially unlimited in practice.

2. A method as in claim 1 wherein, for substantially any at least two of said original messages, there exist at least two possible choices for said corresponding first keys that would produce the same said first messages with different correspondences between the original messages and the first messages.

3. A method as in claim 2 wherein said first keys are chosen from a distribution so that said at least two choices for said first keys are possible.

4. A method for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said method for processing comprising the steps of:

blinding a plurality of original digital messages $m_i$ by use of plural first keys to produce a corresponding plurality of blinded first messages $t_i$;

applying a public key digital signature to each of said first digital messages $t_i$, using one key $d_j$ of a plurality of secret signing keys, to produce a corresponding plurality of signed digital second messages $t'_{ij}$;

unblinding said plurality of signed digital second messages in a way depending at least in part on said plural first keys to produce a corresponding plurality of unblinded digital third messages $m'_{ij}$ having validity which can be checked by using a public checking key $e_j$ corresponding to said secret signing key $d_j$;

said first keys being provided so as to make substantially computationally infeasible substantial linking, even using the secret signing keys, of individual messages within an unblinded signed digital third message set to the individual messages of its corresponding antecedent original digital message set; and at least one of said blinding and unblinding steps being performed using an amount of computation which grows less than linearly with respect to the number of secret signing keys useable in the system.

5. A method as in claim 4 wherein, for substantially any at least two of said original messages, there exist at least two possible choices for said corresponding first keys that would produce the same said first messages and different correspondences between the original messages and the first messages.

6. A method as in claim 5 wherein said first keys are chosen from a distribution so that said at least two choices for said first keys are possible.

7. A method for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said method for processing comprising the steps of:

blinding a plurality of original digital messages $m_i$ by use of plural first keys to produce a corresponding plurality of blinded first messages $t_i$;

applying a public key digital signature, using one key $d_j$ of a plurality of secret signing keys, to each of said first digital messages $t_i$ to produce a corresponding plurality of signed digital second messages $t'_{ij}$;

unblinding said plurality of signed digital second messages in a way depending at least on said plural first keys to produce a corresponding plurality of unblinded digital third messages $m'_{ij}$ having validity which can be checked by using a public checking key $e_j$ corresponding to said secret signing key $d_j$;

said first keys being provided so as to make substantially computationally infeasible substantial linking, even using the secret signing keys, of individual messages within an unblinded signed digital third message set to the individual messages of its corresponding antecedent original digital message set; and at least one of said blinding and unblinding steps being performed using an amount of computation that does not grow once the number of secret signing keys useable in the system reaches some threshold.

8. A method as in claim 7 wherein, for substantially any at least two of said original messages, there exist at least two possible choices for said corresponding first keys that would produce the same said first messages with different correspondences between the original messages and the first messages.

9. A method as in claim 8 wherein said first keys are chosen substantially independently from a distribution so that said at least two choices for said first keys are possible.

10. A method for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said method for processing comprising the steps of:

blinding a plurality of original digital messages responsive to first keys to produce corresponding blinded first digital messages, said blinding including for each said original digital message at least forming a product including said original digital message and at least one generator and generators appearing in said product being raised to powers depending on at least one of said first keys;

signing each of said first messages by applying a public key digital signature transformation thereto to produce a corresponding plurality of digital second messages, and signing including at least raising to a power depending on a secret signing key;

unblinding said plurality of second messages by transforming each at least by forming a product including a multiplicative inverse of a signed form of said at least one generator raised to a power depending on at least one of said first keys, to produce a corresponding plurality of signed digital third messages related to said original messages and where the digital signature property derives from said at least one secret signing key, said products, multiplicative inverses and raising to powers all being in a finite structure where they are defined; and said blinding step being performed using separate said first keys so as to make substantially computationally infeasible substantial linking, even using said secret signing key, of individual messages within said plurality of third messages to individual messages within said plurality of first messages.

11. A method as in claim 10 wherein, for substantially any at least two of said original messages, there exist at least two possible choices for said corresponding first keys that would produce the same said first messages and where the different choices would produce different correspondences between the original messages and the first messages.

12. A method as in claim 11 wherein said first keys are chosen from a distribution so that said two choices for said first keys are possible.

13. A method as in claim 10 wherein at least two distinct said generators are used in said blinding and corresponding said unblinding of at least one of said original digital messages.

14. A method as in claim 13 wherein one of said generators is the multiplicative inverse of unity.

15. The method of claim 10 further comprising the step of testing a set of generators to determine whether they generate a group containing said original messages.

16. A method of claim 1, 4, 7, or 10 further comprising the step of checking the public key digital signature property of at least one of said third messages.

17. The method of claim 16 further comprising the step of storing a message between said signing step and said checking step.

18. The method of claim 1, 4, 7, or 10 further comprising a re-blinding step that, responsive to at least one of said first keys, transforms an unblinded signed message into a blinded signed message.

19. A method as described in claim 1, 4, 7, or 10 wherein:

said blinding step transforms an original message m in an RSA system with public modulus n using a first key comprised of k1 through kr, with $r \geq 1$, and known generators $g_1$ through $g_r$ to produce first message t described by $$t = m g_1^{k1} g_2^{k2} \ldots g_r^{kr} \pmod{n};$$

said signing step transforms said first message t using secret signing key di to produce second message t' described by $$t' = t^{di} \pmod{n}; \text{ and}$$

said unblinding step transforms said second message t' using said first key comprised of k1 through kr and using known signed forms of said generators $g_1$ through $g_r$ to produce said third message m'j described by $$m'_j = t' g_1^{-di k1} g_2^{-di k2} \ldots g_r^{-di kr} \pmod{n}.$$

20. The method of claim 19 wherein at least one of said generators $g_j$ is $-1$.

21. The method of claim 19 further comprising the step of testing a set of generators to determined whether they generate a group containing said original messages.

22. The method of claim 19 wherein at least one said first key is chosen substantially uniformly from an interval whose size is at least a substantially large multiple of n.

23. Apparatus for processing a plurality of original digital messages by plural provider parties before they are transformed with public key digital signatures by a signer party and for processing the resulting messages by the corresponding provider parties after they have been transformed with the public key digital signatures where said processed digital messages are considered to be "blinded" and said resulting digital messages to be "unblinded" because, although the public key digital signatures of said resulting digital messages are checkable using a public key, the signer is unable to determine the correspondence between elements of said processed digital message set and elements of the corresponding said resulting digital message set, said apparatus comprising:

means for blinding a plurality of original digital messages by a plurality of corresponding supplier parties transforming each such message at least partially responsive to a corresponding first key to produce corresponding digital first messages, without anticipating which of a set of corresponding signing keys will be used to sign each first message;

means for signing each of said first messages by a signer party applying a public key digital signature being one member of said set of secret signing keys to produce a corresponding plurality of second messages;

means for unblinding said plurality of second messages by said supplier parties transforming each at least partially responsive to said first keys to produce a corresponding plurality of digital third messages which retain a public key digital signature property related to said original messages and to said corresponding secret key of said signing step;

said means for said blinding including means used by said supplier parties wherein said first keys are used so as to make said signer party without the corresponding first keys unable to readily determine the correspondence between individual messages within said plurality of third messages and individual messages within said plurality of first messages; and wherein the number of members of said set of signing keys potentially unblindable by said unblinding step is being substantially unlimited in practice.

24. Apparatus in claim 23 wherein, for substantially any at least two of said original messages, there exist at least two possible choices for said corresponding first keys that would produce the same said first messages with different correspondences between the original messages and the first messages.

25. Apparatus as in claim 24 wherein said means for blinding includes means for choosing said first keys from a distribution so that said at least two choices for said first keys are possible.

26. Apparatus for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said apparatus comprising:

means for blinding a plurality of original digital messages $m_i$ by use of plural first keys to produce a corresponding plurality of blinded first messages $t_i$;

means for applying a public key digital signature to each of said first digital messages $t_i$, using one key $d_j$ of a plurality of secret signing keys, to produce a corresponding plurality of signed digital second messages $t'_{ij}$;

means for unblinding said plurality of signed digital second messages in a way depending at least in part on said plural first keys to produce a corresponding plurality of unblinded digital third messages $m'_{ij}$ having validity which can be checked by using a public checking key $e_j$ corresponding to said secret signing key $d_j$;

wherein said first keys are provided by said means for blinding so as to make substantially computationally infeasible substantial linking, even using the secret signing keys, of individual messages within an unblinded signed digital third message set to the individual messages of its corresponding antecedent original digital message set; and at least one of said means for blinding and means for unblinding include means performing an amount of computation which grows less than linearly with respect to the number of secret signing keys useable in the system.

27. Apparatus as in claim 26 wherein, for substantially any at least two of said original messages, there exist at least two possible choices for said corresponding first keys that would produce the same said first messages and different correspondences between the original messages and the first messages.

28. Apparatus as in claim 27 wherein said means for blinding chooses said first keys from a distribution so that said at least two choices for said first keys are possible.

29. Apparatus for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said apparatus comprising:

means for blinding a plurality of original digital messages $m_i$ by use of plural first keys to produce a corresponding plurality of blinded first messages $t_i$;

means for applying a public key digital signature, using one key $d_j$ of a plurality of secret signing keys, to each of said first digital messages $t_i$ to produce a corresponding plurality of signed digital second messages $t'_{ij}$;

means for unblinding said plurality of signed digital second messages in a way depending at least on said plural first keys to produce a corresponding plurality of unblinded digital third messages $m'_{ij}$ having validity which can be checked by using a public checking key $e_j$ corresponding to said secret signing key $d_j$;

wherein said first keys are provided by said means for blinding so as to make substantially computationally infeasible substantial linking, even using the secret signing keys, of individual messages within an unblinded signed digital third message set to the individual messages of its corresponding antecedent original digital message set; and wherein at least one of said means for blinding and unblinding include means for performing an amount of computation that does not grow once the number of secret signing keys useable in the system reaches some threshold.

30. Apparatus as in claim 29 wherein, for substantially any at least two of said original messages, there exist at least two possible choices for said corresponding first keys that would produce the same said first messages with different correspondences between the original messages and the first messages.

31. Apparatus as in claim 30 wherein said means for blinding chooses said first keys substantially independently from a distribution so that said at least two choices for said first keys are possible.

32. Apparatus for processing a plurality of original digital messages before they receive public key digital signatures and for processing the resulting messages after they have received the public key digital signatures where said processed digital messages are considered to be "blinded" and said resulting digital messages to be "unblinded" because, although the public key digital signatures of said resulting digital messages are checkable using a public key, even possession of the public key and of the corresponding secret signing key does not readily allow the correspondence between the elements of said processed digital message set and the elements of the corresponding said resulting digital message set to be determined, said apparatus comprising:

means for blinding a plurality of original digital messages responsive to first keys to produce corresponding blinded first digital messages, said blinding including for each said original digital message at least forming a product including said original digital message and at least one generator and generators appearing in said product being raised to powers depending on at least one of said first keys;

means for signing each of said first messages by applying a public key digital signature transformation thereto to produce a corresponding plurality of digital second messages, said signing including at least raising to a power depending on a secret signing key;

means for unblinding said plurality of second messages by transforming each at least by forming a product including a multiplicative inverse of a signed form of said at least one generator raised to a power depending on at least one of said first keys, to produce a corresponding plurality of signed digital third messages related to said original messages and where the digital signature property derives from said at least one secret signing key, said products, multiplicative inverses and raising to powers all being in a finite structure where they are defined; and said means for blinding including means using separate said first keys so as to make substantially computationally infeasible substantial linking, even using said secret signing key, of individual messages within said plurality of third messages to individual messages within said plurality of first messages.

33. Apparatus as in claim 32 wherein, for substantially any at least two of said original messages, there exist at least two possible choices for said corresponding first keys that would produce the same said first messages and where the different choices would produce different correspondences between the original messages and the first messages.

34. Apparatus as in claim 33 wherein said means for blinding includes means for choosing said first keys from a distribution so that said two choices for said first keys are possible.

35. Apparatus as in claim 32 wherein said means for blinding and means for unblinding use at least two distinct said generators in said blinding and corresponding said unblinding of at least one of said original digital messages.

36. Apparatus as in claim 35 wherein one of said generators is the multiplicative inverse of unity.

37. Apparatus as in claim 32 further comprising means for testing a set of generators to determine whether they generate a group containing said original messages.

38. Apparatus as in claim 23, 26, 29 or 32 further comprising means for checking the public key digital signature property of at least one of said third messages.

39. Apparatus as in claim 38 further comprising means for storing a message between said signing step and said checking step.

40. Apparatus as in claim 23, 26, 29 or 32 further comprising means for re-blinding, responsive to at least one of said first keys, to transform an unblinded signed message into a blinded signed message.

41. Apparatus as described in claim 23, 26, 29 or 32 wherein:

said means for blinding transforms an original message m in an RSA system with public modulus n using a first key comprised of k1 through kr, with $r \geq 1$, and known generators $g_1$ through $g_r$ to produce first message t described by $$t = m g_1^{k_1} g_2^{k_2} \ldots g_r^{k_r} (\text{mod } n);$$

said means for signing transforms said first message t using secret signing key di to produce second message t' described by $$t' = t^{di} (\text{mod } n); \text{ and}$$

said means for unblinding transforms said second message t' using said first key comprised of k1 through kr and using known signed forms of said generators $g_1$ through $g_r$ to produce said third message m'j described by $$m'_j = t' g_1^{-di k_1} g_2^{-di k_2} \ldots g_r^{-di k_r} (\text{mod } n).$$

42. Apparatus as in claim 41 wherein at least one of said generators $g_j$ is $-1$.

43. Apparatus as in claim 41 further comprising means for testing a set of generators to determined whether they generate a group containing said original messages.

44. Apparatus as in claim 41 wherein said means for blinding includes means for choosing at least one said first key substantially uniformly from an interval whose size is at least a substantially large multiple of n.

* * * * *